Figure 1:
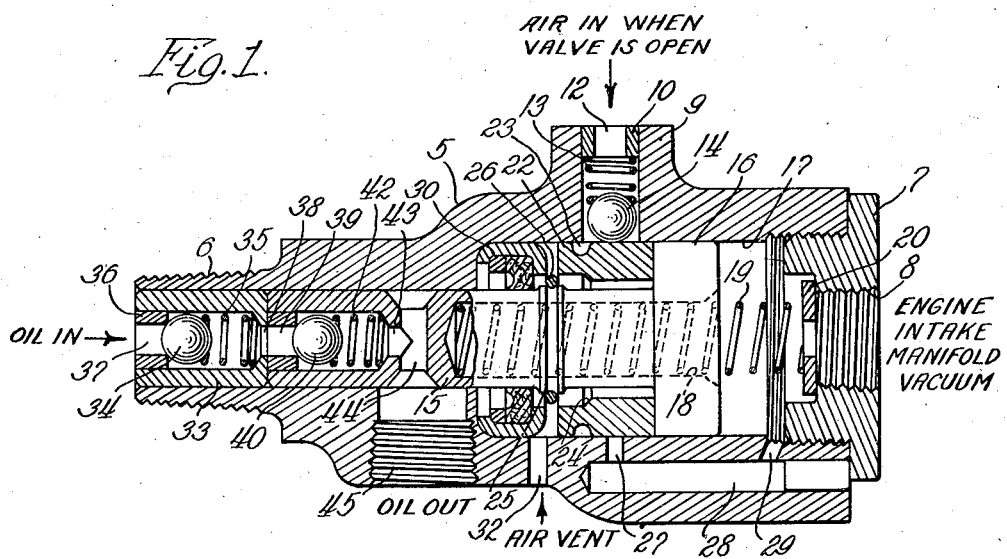

April 17, 1945.  R. BACKOFEN ET AL  2,373,642

PUMP

Filed April 28, 1943

INVENTORS
Robert Lapsley
Ryan Backofen
BY Walter E. Schirmer
Atty.

Patented Apr. 17, 1945

2,373,642

UNITED STATES PATENT OFFICE 2,373,642

PUMP

Ryan Backofen, Battle Creek, and Robert Lapsley, Berrien Springs, Mich., assignors to Clark Equipment Company, Buchanan, Mich., a corporation of Michigan Application April 28, 1943, Serial No. 484,938

3 Claims. (Cl. 103—50)

This invention relates to valve assemblies, and more particularly is directed to a valve construction for withdrawing leakage fluid from the sump of a torque converter or the like and returning it to the fluid system of the torque converter.

The present invention concerns itself particularly with a valve mechanism capable of control from the intake manifold of an engine or manual control of the operator for withdrawing leakage fluids from the torque converter of a vehicle and returning it to the fluid reservoir or to the inlet side of the fluid pump.

One of the objects of the invention is to provide a simple valve construction which will positively operate to withdraw the fluid by reciprocation of a plunger or valve element, this reciprocation being controlled either manually or by the engine manifold vacuum.

Other objects and advantages of the present invention will appear more fully from the following detailed description which, taken in conjunction with the accompanying drawing, will disclose to those skilled in the art the particular construction and operation of preferred forms of the present invention.

Figure 2:
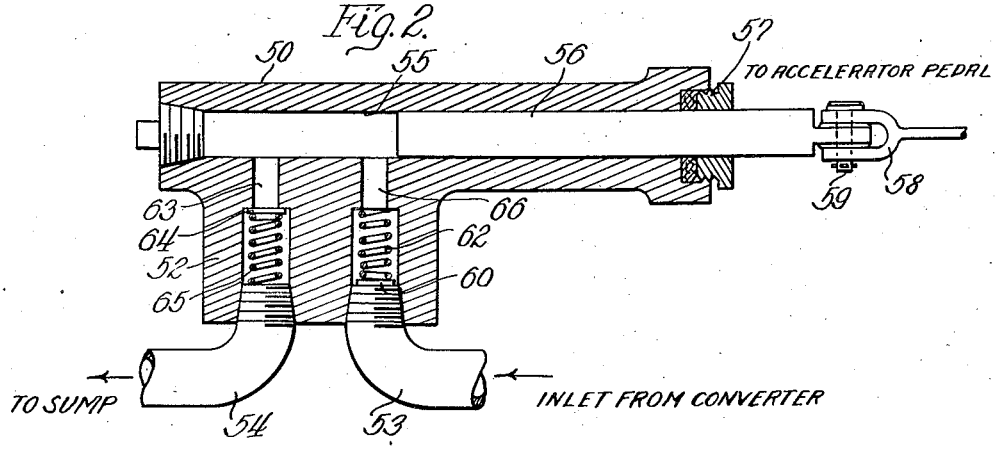

In the drawing:

Figure 1 is a sectional view through a valve adapted to be controlled by engine intake manifold vacuum; and Figure 2 is a sectional view through a valve construction adapted to be manually controlled from the accelerator pedal.

Referring now in detail to Figure 1, we have provided a valve body 5 having a threaded end 6 adapted to be screwed into the sump of a torque converter directly or to be fitted with a pipe or conduit leading to such sump. At its opposite end the valve body 5 is provided with a threaded cap or bushing 7 suitably tapped as at 8 to receive a conduit connecting the interior of the valve body to the engine intake manifold, thereby providing a vacuum connection to this end of the valve body.

Intermediate its ends the valve body is provided with an offset boss portion 9 receiving the sleeve 10 forming a valve port 12, and also providing a seat for a spring 13 bearing against a ball 14 disposed in the bore of the boss.

Disposed for reciprocating movement within the valve body is a plunger member 15 having a headed end 16 reciprocal in the enlarged bore of the valve body, and counterbored as at 18 to receive the coil spring 19 biased at one end in the bottom of the counterbore and at the opposite end against the washer 20 seating in the vacuum intake port 8. Loosely surrounding the reduced portion or shank of the plunger 15 is a ring or sleeve 22 having an annular external groove 23 and having a counterbored end 24. The shank of the valve body 15 is provided with a collar 25 carrying a ring member 26, which ring member is adapted upon movement of the plunger 15 to the right to engage in the counterbore 24 after predetermined motion of the plunger for producing simultaneous movement of the sleeve 22 to move the groove 23 thereof into alignment with the ball 14. Due to the ball 14 being of considerably greater radius than that of groove 23, the ball only partially seats in the groove, thereby allowing air to pass around the ball into the groove. This provides communication between the air port 12 through the groove 23 with the port 27 on the opposite side of the valve body, and thence thru the passageway 28 and port 29 into the interior of the valve chamber above the head 16 of the plunger. This provides for breaking the vacuum in the chamber, thereby allowing the spring 19 to move the valve plunger to the left so that in operation, the plunger is drawn to the right by engine vacuum, and as the groove 23 aligns with the ball 14, air is introduced into the head end of the cylinder or bore of the valve to break the vacuum and to allow the spring to return the valve to the position shown in Figure 1, thereby producing a reciprocating action of the plunger 15. The ball 14 forms a detent for holding sleeve 22 in position with the grooves 23 alined with bore 27 until the vacuum is broken and the return motion of the plunger head 16 carries the sleeve 22 back into the position shown in Figure 1.

A suitable oil seal 30 is provided in the lower end of the counterbore 17 of the valve body to prevent any oil leaking past the shank 15 of the plunger into the interior of the plunger chamber. A suitable vent port 32 allows air to escape during movement of the valve.

The extending shank of the plunger 15 is adapted to bottom against a sleeve 33 pressed into the end of the valve body, which sleeve carries the ball check valve 34 normally held in closed position by the spring 35. A suitable bushing 36 defines the oil inlet port 37 through which leakage oil from the torque converter is introduced into the valve. Upon movement of the plunger to the right, suction is produced in the inlet port 37, drawing leakage fluid therein. As the plunger reciprocates due to breaking of the vacuum, this oil is forced past the ball 34 and through the port 38 at the inner end of the sleeve 33 into the port 39 formed at the lower end of the plunger 15 and controlled by the ball valve 40. This valve 40 is normally spring pressed into position by means of the spring 32, but upon movement of the plunger to the left, is unseated to allow oil to pass therethrough and through the port 43 and transverse port 44 into the oil outlet port 45 connected to the fluid reservoir or the inlet side of the fluid pump of the converter. Consequently, upon alternate reciprocation of the plunger 15, oil is drawn into the valve body through port 37 and thence is forced outwardly past ball valve 40 and through ports 43 and 44 into the outlet port 45. The provision of the loose sleeve 22 in the enlarged bore 17 of the valve body provides for breaking of the vacuum to produce the reciprocating action of the plunger, which in turn provides the pumping action for withdrawing the leakage fluid from the torque converter.

In the form of the invention shown in Figure 2, which is a very simplified construction, a valve body 50 is provided having an offset boss portion 52 adapted to receive the conduit 53 leading from the oil sump of the torque converter and the conduit 54 leading to the reservoir or sump of the fluid system for the converter. The valve body 50 is provided with a longitudinal bore or chamber 55 within which is mounted the piston member 56 adapted to have axial reciprocatory movement therein. The member 56 extends outwardly through the backing gland 57 and its outer end is connected by means of the clevis 58 and pin 59 to the accelerator pedal of the vehicle, whereby alternate depression and release of the accelerator pedal will produce reciprocatory movement of the piston 56, creating alternately a pressure and vacuum condition within the bore 55 of the valve body.

The conduit 53 is normally closed by a flapper type valve 60 held in position by a spring 62, while the conduit 54 opens into a passageway 63 normally closed by the flapper valve 64 held in position by the spring 65. The valve 60 of the conduit 53 controls flow of fluid through the passageway 66 into the bore 55 of the valve body, while the port 63 controls discharge of fluid from the valve body into the conduit 54.

In the operation of this particular valve construction, movement of the piston 56 to the right produces suction in the cylinder, causing valve 60 to lift from its seat, while maintaining valve 64 on its seat. This results in drawing oil through the conduit 53 from the torque converter into the chamber 55. Upon movement of the piston 56 to the left, the valve 60 is forced onto its seat, while the pressure of the fluid forces valve 64 open, discharging the fluid from the cylinder 55 into the conduit 54 and thence to the reservoir of the fluid system. Thus, reciprocation of the piston 56 draws fluid down from the converter and discharges it into the sump or reservoir. Thus, reciprocation of the accelerator pedal will result in pumping the fluid from the converter into the reservoir through the valve mechanism described in Figure 2.

It is therefore apparent that we have provided a very simple type of valve construction for withdrawing leakage fluid from the torque converter and returning it to the fluid system of the converter.

We are aware that many modifications of this type of mechanism might be made without departing from the underlying principles herein shown and described, and we therefore do not intend to be limited except as defined by the scope and spirit of the appended claims.

We claim:

1. In combination, a pump body, a plunger reciprocatory therein and having an enlarged head end, a spring normally urging said plunger in one direction, vacuum means operable to draw said plunger in the opposite direction, an air inlet port into said vacuum means, means surrounding said plunger and operable upon predetermined movement of said plunger under the influence of said vacuum means to move axially therewith for opening said port to atmosphere whereupon said spring returns said plunger in the opposite direction, closing said port, a valve fixed in the end of said pump body and opened by movement of said plunger in one direction to admit fluid therepast into said pump body, means forming a fluid outlet from said pump body and a second valve carried by said plunger end and opened by movement of said plunger in the opposite direction for discharging the fluid admitted by said first valve through said outlet.

2. A pump construction comprising a body member having a plunger therein normally biased in one direction, means providing a vacuum connection to said member for drawing said plunger in the opposite direction, means slideable in said member and having a lost motion connection with said plunger and responsive to predetermined movement of said plunger in said latter direction for admitting air into said vacuum connection to return said plunger toward its biased position, a fluid inlet port and a fluid outlet port in said body member, valve means controlled by reciprocation of said plunger for drawing fluid into said body member through said inlet port upon movement of said plunger in said latter direction and forcing it out of said member upon return movement of said plunger, said air admitting means comprising a grooved sleeve, means for moving said sleeve conjointly with said plunger after predetermined movement thereof in one direction, an air inlet port, and an air passageway into said vacuum connection, said sleeve being movable into position by said plunger to aline said groove for communication between said port and passageway.

3. A pump construction comprising a body member having a plunger therein normally biased in one direction, means providing a vacuum connection to said member for drawing said plunger in the opposite direction, means slideable in said member and having a lost motion connection with said plunger and responsive to predetermined movement of said plunger in said latter direction for admitting air into said vacuum connection to return said plunger toward its biased position, a fluid inlet port and a fluid outlet port in said body member, valve means controlled by reciprocation of said plunger for drawing fluid into said body member through said inlet port upon movement of said plunger in said latter direction and forcing it out of said member upon return movement of said plunger, said air admitting means comprising an annular grooved sleeve surrounding said plunger, means on said plunger operable after predetermined movement of said plunger in one direction for moving said sleeve conjointly therewith, and air port means opening into said vacuum connection through said groove, said plunger returning said sleeve to inoperative position upon admission of air to said vacuum connection.

RYAN BACKOFEN.
ROBERT LAPSLEY.